United States Patent
Borglum et al.

(10) Patent No.: US 7,118,086 B1
(45) Date of Patent: Oct. 10, 2006

(54) PINCH VALVE WITH INLET AND OUTLET PORTS

(75) Inventors: Anthony R. Borglum, Cedar Falls, IA (US); John C. Estapa, Lynnville, IA (US); Corey W. Cerwinske, Waverly, IL (US); Richard P. Borglum, Janesville, IA (US); Perry R. Anderson, Scottsdale, AZ (US)

(73) Assignee: Richway Industries Ltd., Janesville, IA (US)

( * ) Notice: Subject to any disclaimer, the term of this patent is extended or adjusted under 35 U.S.C. 154(b) by 0 days.

(21) Appl. No.: 11/071,938

(22) Filed: Mar. 4, 2005

(51) Int. Cl.
*F16K 7/04* (2006.01)

(52) U.S. Cl. .................... 251/5; 251/30.01
(58) Field of Classification Search ............. 251/5, 251/129.15, 30.02, 30.05, 30.01
See application file for complete search history.

(56) References Cited

U.S. PATENT DOCUMENTS

| | | | | |
|---|---|---|---|---|
| 2,786,642 A | * | 3/1957 | Comb | 251/30.05 |
| 3,007,416 A | | 11/1961 | Childs | |
| 3,118,646 A | * | 1/1964 | Markey | 251/5 |
| 3,145,967 A | * | 8/1964 | Gardner | 251/5 |
| 3,353,560 A | | 11/1967 | McCulloch | |
| 3,490,732 A | | 1/1970 | Leroy | |
| 3,514,034 A | | 5/1970 | Cushman | |
| 3,631,847 A | | 1/1972 | Hobbs | |
| 3,717,176 A | | 2/1973 | Smith | |
| 3,838,704 A | * | 10/1974 | Johnson | 251/5 |
| 4,303,222 A | | 12/1981 | Campbell | |
| 4,322,054 A | | 3/1982 | Campbell | |
| 4,432,495 A | * | 2/1984 | Bruninga | 239/205 |
| 4,442,954 A | | 4/1984 | Bergandy | |
| 4,454,983 A | | 6/1984 | Tarvis | |
| 4,623,118 A | * | 11/1986 | Kumar | 251/30.01 |
| 4,630,635 A | * | 12/1986 | Bernstein et al. | 251/5 |
| 4,796,804 A | * | 1/1989 | Weiss | 251/5 |
| 4,811,758 A | | 3/1989 | Piper | |
| 5,161,773 A | | 11/1992 | Tower | |
| 5,205,325 A | | 4/1993 | Piper | |
| 5,549,793 A | | 8/1996 | Hellstrom | |
| 6,039,078 A | | 3/2000 | Tamari | |
| 6,079,628 A | | 6/2000 | Kenny | |
| 6,423,035 B1 | | 7/2002 | Das | |

* cited by examiner

*Primary Examiner*—John Bastianelli
(74) *Attorney, Agent, or Firm*—McKee, Voorhees & Sease, P.L.C.

(57) ABSTRACT

A pinch valve includes a body with a passageway extending therethrough, a flexible sleeve mounted within the body and surrounding the passageway, and a cavity between the sleeve and the body. An inlet opening provides control fluid flow into the cavity, while an outlet opening allows for fluid exhaust from the cavity. The diameters of the inlet and outlet openings are fixed, with the inlet diameter being smaller than the outlet diameter. A two-way control valve opens and closes the outlet opening, and thereby controls opening and closing of the pinch valve.

6 Claims, 1 Drawing Sheet

PINCH VALVE WITH INLET AND OUTLET PORTS

BACKGROUND OF THE INVENTION

Conventional pinch valves include a single port for inlet and outlet of control fluid to and from the valve cavity surrounding the flexible sleeve which opens and closes the passageway through the valve. A three-way valve is provided upstream from the port to control the inlet and outlet of fluid to the cavity. In a first position, the three-way control valve allows fluid to flow into the cavity, and thereby close the valve. In a second static position, the control valve is closed so that fluid does not flow to or from the cavity, such that the pinch valve remains closed. In a third position, the control valve exhausts fluid from the cavity, thereby opening the pinch valve. Such a three-way valve is normally more expensive than a two-way valve, and thus increases the cost of the pinch valve.

Pinch valves having dual inlet and outlet ports are also known, although expensive controls are necessary for opening and closing the valve. For example, U.S. Pat. No. 5,549,793 uses a control valve on a inlet opening operated in a pulse width modulated manner to control pressure within the pinch valve cavity, and has an inlet opening and a bleed or leak outlet to release pressure from the pinch valve cavity. The means for varying the diameter of the opening in the U.S. Pat. No. 5,549,793 patent increases the cost of the pinch valve. U.S. Pat. No. 4,454,983 also shows a pinch valve with an inlet opening to the pinch valve cavity and a smaller outlet opening which is controlled by a manual valve to open and close the pinch valve. The smaller outlet opening, as compared to the inlet opening, slows or delays the opening of the pinch valve, since pressure in the cavity is slowly released from the cavity.

Accordingly, a primary objective of the present invention is the provision of an improved pinch valve having separate inlet and outlet openings for controlling opening and closing of the pinch valve.

Another objective of the present invention is the provision of an improved pinch valve having inlet and outlet openings with a fixed diameter, to reduce cost of the pinch valve.

A further objective of the present invention is the provision of an improved pinch valve wherein the inlet opening is smaller than the outlet opening to facilitate opening of the pinch valve.

Another objective of the present invention is the provision of an improved pinch valve having inlet and outlet openings, with a control valve for the outlet opening.

Yet another objective of the present invention is the provision of an improved pinch valve which controls opening and closing of the valve without anemically controlling the fluid flow rate into the pinch valve cavity.

Another objective of the present invention is the provision of an improved pinch valve which controls only the outflow of control fluid from the pinch valve cavity, without controlling the inflow of fluid into the cavity.

Still another objective of the present invention is the provision of an improved pinch valve having a check valve for the control fluid inlet opening to prevent backflow of fluid from the inlet opening.

Another objective of the present invention is the provision of an improved pinch valve which is economical to manufacture and durable and efficient in use.

These and other objectives will become apparent from the following description of the invention.

SUMMARY OF THE INVENTION

The pinch valve of the present invention includes a valve body with a passageway extending longitudinally therethrough. A flexible sleeve is secured within the body and surrounds the passageway. A cavity resides between the sleeve and the body. An inlet opening on the body allows fluid flow into the cavity. An outlet opening on the body allows fluid exhaust from the cavity. The inlet and outlet openings have fixed diameters, with the inlet diameter being smaller than the outlet diameter. A two-way control valve opens and close the outlet opening, and thereby controls opening and closing of the passageway of the pinch valve.

DETAILED DESCRIPTION OF THE PREFERRED EMBODIMENT

Figure 1:
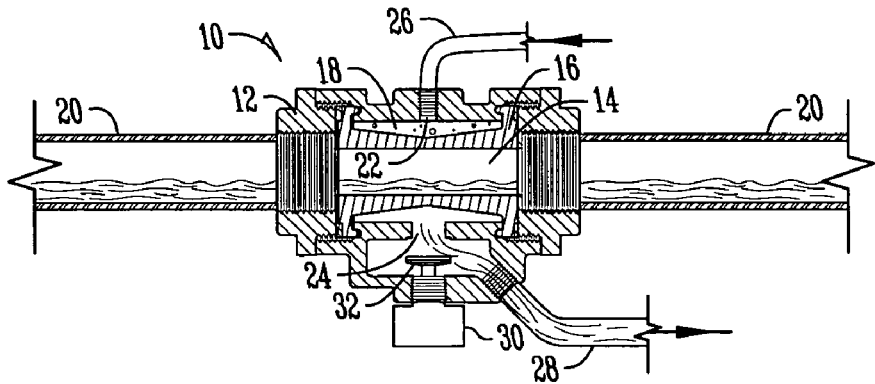
FIG. 1 is a sectional view showing the pinch valve of the present invention in an open state.

A pinch valve is generally designated in the drawings by the reference numeral 10. The pinch valve includes a body 12 with a passageway 14 extending longitudinally through the body. A flexible sleeve 16 is secured within the body, with the cavity 18 surrounding the sleeve. The pinch valve 10 resides within a fluid line or pipe 20 to control the flow of fluid through the pipe 20.

The pinch valve 10 includes an inlet orifice or opening 22 and an outlet orifice or opening 24, both of which are in communication with the cavity 18. A fluid supply line 26 is connected to the inlet opening 22 and a fluid exhaust line 28 is operatively connected to the outlet opening 24. The diameter of the inlet and outlet openings 22, 24 are fixed, with the diameter of the inlet opening 22 being smaller than the diameter of the outlet opening 24. The ratio of the inlet and outlet opening diameters is dependent upon the type of actuation fluid used for the pinch valve 10, the fluid pressures, the pressure differentials across the pinch valve 10, the volume of the fluid cavity 18, and/or the desired operating speed for the pinch valve 10.

Figure 2:
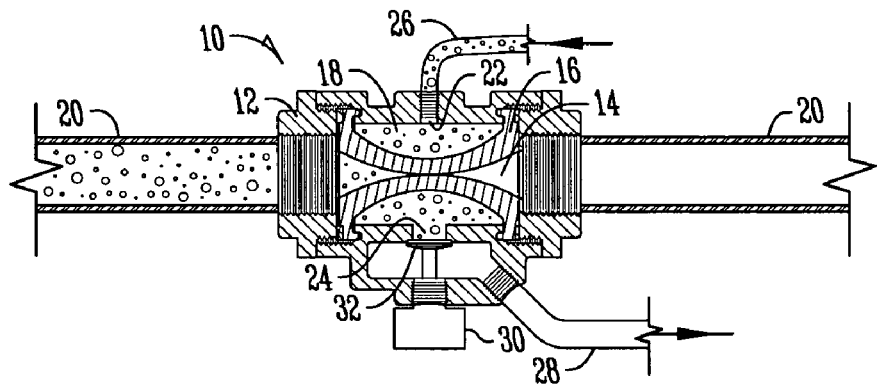
FIG. 2 is a view of the pinch valve of the present invention in a closed state.

The supply line 26 is connected to a pressurized source of fluid such that the fluid can be introduced into the cavity 18 of the pinch valve 10. A solenoid valve 30 is provided adjacent the outlet opening 24 to control opening and closing of the pinch valve 10. As seen in FIG. 1, the solenoid valve 30 is open, with the head 32 of the solenoid valve 30 being retracted from the outlet opening 24. When the solenoid valve 30 is open, fluid from the supply line 26 enters the cavity 18 through the inlet opening and is exhausted through the outlet opening 24 without closing the pinch valve 10, such that fluid may flow through the pipe 20 and the pinch valve 10. When the solenoid valve 30 is actuated to a closed position, as shown in FIG. 2, the solenoid head 32 seals the outlet opening 24 to preclude exhaust of the fluid, thereby constricting the sleeve 16 to close the pinch valve 10, and stop the flow of fluid through the pipe 20.

Figure 3:
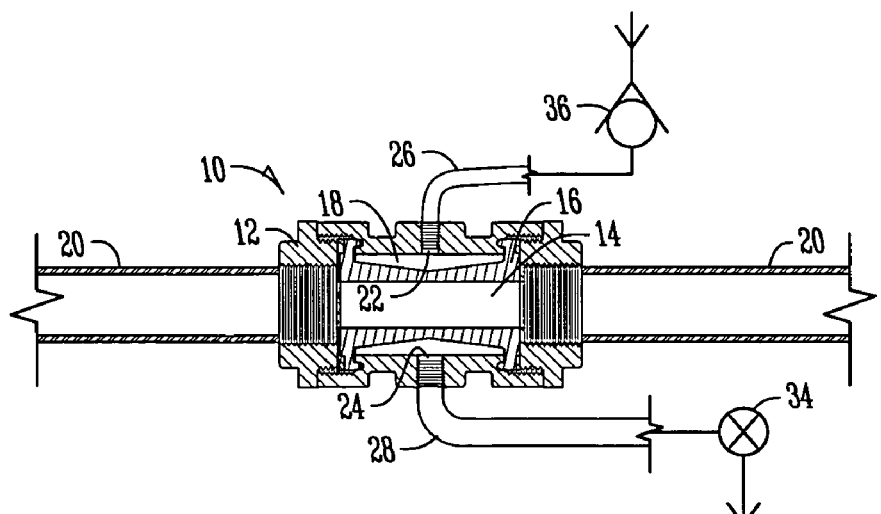
FIG. 3 is a view of an alternative embodiment of the pinch valve.

FIG. 3 shows an alternative embodiment of the pinch valve 10A wherein the solenoid valve is replaced with any other conventional two-way valve 34. For example, the valve 34 may be a poppet valve, a ball valve, a gate valve, a spool valve, or other type of valve. The valve 34 may be actuated electrically, manually, pneumatically, or hydraulically.

As further seen in FIG. 3, a check valve 36 is provided in the supply line 26 to preclude fluid from back flowing through the supply line 26. The check valve 36 may be any of several types, depending upon the pressures and the control fluid. For example the check valve 36 may be a ball/spring valve, a duckbill valve, a disk valve, a disk/spring valve, or a poppet/spring valve.

In the preferred mode of operation, the supply line 26 constantly supplies control fluid through the inlet opening 22 and into the cavity 18. If the outlet opening 24 is closed, the fluid flowing into the cavity 18 collapses or compresses the sleeve 16, and thereby closes the pinch valve 10. If the outlet opening 24 is open, the control fluid flows out of the cavity 18 at a faster rate than the inlet flow, thus allowing the sleeve 16 to expand, and thereby open the pinch valve 10.

While the drawings show the inlet opening 22 and outlet opening 24 on opposite sides of the pinch valve 10, it is understood that these openings may be located anywhere on the body 12 wherein they are in fluid communication with the cavity 18. For example, the openings 22, 24 could be located next to one another on the same side of the valve.

If the control fluid for the pinch valve 10 is the same as the fluid passing through the pipe 20, it is possible to discharge the control fluid from the exhaust line 28 into the pipe 20 downstream from the pinch valve 10.

Preferably, the solenoid valve 30 or two-way valve 34 is normally closed, such that the pinch valve 10, 10A is normally closed. If the actuation fluid pressure through the supply line 26 is reduced to zero while the outlet opening 24 is closed, the actuation fluid in the cavity 18 is trapped, thereby maintaining the pinch valve 10, 10A in a closed state. For example, if electric power is lost, the solenoid valve 30 or two-way valve 34 will immediately close or remain closed, and the check valve 36 will prevent back flow of actuation fluid through the supply line 26, such that the pinch valve 10, 10A will remain closed. Thus, a normally closed, fail safe system is provided wherein the pinch valve is normally closed, except when the solenoid valve 30 or two-way valve 34 is opened.

The pinch valves 10, 10A of the present invention are simple in construction, with fixed diameters of the inlet and outlet openings 22, 24. Thus, the present invention does not include expensive dynamic controls to adjust the flow rate of the actuation fluid during operation, but rather provides only for on/off control of the pinch valve 10, 10A. Accordingly, the cost of the pinch valve is minimized while providing an efficient and effective valve.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A pinch valve, comprising:
   a valve body with a passageway there through;
   a flexible sleeve within the body and surrounding the passageway, the flexible sleeve being collapsible to a position of sealing engagement upon itself for closing off the passageway;
   a cavity between the sleeve and the body;
   an inlet opening to provide fluid flow from outside the passageway into the cavity;
   an outlet opening to provide fluid flow from the cavity to outside the passageway;
   the inlet and outlet openings having fixed diameters, with the inlet diameter being smaller than the outlet diameter; and
   a two-way control valve to open and close the outlet opening and thereby open and close the passageway.

2. The pinch valve of claim 1 wherein the inlet opening is always open whether the flexible sleeve is open or closed.

3. The pinch valve of claim 1 wherein the inlet opening is valveless.

4. The pinch valve of claim 1 further comprising a check valve upstream from the inlet opening.

5. The pinch valve of claim 1 wherein the control valve is a solenoid valve.

6. The pinch valve of claim 1 wherein the control valve is normally closed such that the pinch valve is normally closed.

* * * * *